United States Patent
Hu

(10) Patent No.: US 12,348,145 B2
(45) Date of Patent: Jul. 1, 2025

(54) MULTIPHASE SWITCHING CONVERTER WITH FAULT DETECTION AND FAULT DETECTION METHOD THEREOF

(71) Applicant: Chengdu Monolithic Power Systems Co., Ltd., Chengdu (CN)

(72) Inventor: Wangmiao Hu, Hangzhou (CN)

(73) Assignee: Chengdu Monolithic Power Systems Co., Ltd., Sichuan (CN)

( * ) Notice: Subject to any disclaimer, the term of this patent is extended or adjusted under 35 U.S.C. 154(b) by 61 days.

(21) Appl. No.: 18/505,893

(22) Filed: Nov. 9, 2023

(65) Prior Publication Data

US 2024/0072671 A1 Feb. 29, 2024

(30) Foreign Application Priority Data

Nov. 17, 2022 (CN) .......................... 202211440301.7

(51) Int. Cl.
*H02M 3/158* (2006.01)
*H02M 1/00* (2006.01)
*H02M 1/32* (2007.01)

(52) U.S. Cl.
CPC ....... *H02M 3/1584* (2013.01); *H02M 1/0009* (2021.05); *H02M 1/325* (2021.05); *H02M 3/1586* (2021.05)

(58) Field of Classification Search
CPC ............. H02M 3/1586; H02M 1/0009; H02M 3/1584; H02M 1/325; H02M 1/327; H02M 1/32
See application file for complete search history.

(56) References Cited

U.S. PATENT DOCUMENTS

| | | | | |
|---|---|---|---|---|
| 7,759,918 B2* | 7/2010 | Moyer | ................ | H02M 3/1584 323/272 |
| 8,358,113 B2* | 1/2013 | Cheng | ..................... | H02J 1/102 323/272 |
| 8,878,501 B2* | 11/2014 | Kalje | .................. | H02M 3/1584 323/272 |
| 10,243,465 B1* | 3/2019 | Young | ..................... | H02M 1/14 |
| 10,270,343 B2* | 4/2019 | Nguyen | .............. | H02M 3/1584 |
| 10,727,746 B1* | 7/2020 | Yen | ...................... | H02M 3/1584 |
| 11,031,868 B2* | 6/2021 | Cheng | ................. | H02M 3/1584 |
| 11,063,508 B2 | 7/2021 | Lu et al. | | |
| 11,283,358 B2 | 3/2022 | Lu et al. | | |

(Continued)

*Primary Examiner* — Yusef A Ahmed
(74) *Attorney, Agent, or Firm* — Perkins Coie LLP

(57) ABSTRACT

A fault detection method for a multiphase switching converter with a plurality of switching circuits. The fault detection method includes the following steps. 1) Generate a comparing signal by comparing a corresponding current reference signal with a corresponding current sensing signal indicative of a current flowing through a corresponding switching circuit. 2) Generate a duration detecting signal by detecting the duration of the corresponding comparing signal keeping in a first state. 3) Generate a first mode signal indicating whether the corresponding switching circuit is under power operation and a second mode signal indicating whether the corresponding switching circuit works in DCM or CCM. And 4) generate a fault signal indicating whether the corresponding switching circuit is in a fault condition based on the corresponding duration detecting signal, the corresponding first mode signal and the corresponding second mode signal.

20 Claims, 9 Drawing Sheets

(56) References Cited

U.S. PATENT DOCUMENTS

| | | | |
|---|---|---|---|
| 11,303,204 B1* | 4/2022 | Zhao | H02M 3/1588 |
| 11,545,903 B1* | 1/2023 | Li | H02M 1/0006 |
| 11,791,705 B1* | 10/2023 | Chang | H02M 1/0041 |
| | | | 363/65 |
| 11,888,384 B2* | 1/2024 | Brambilla | H02M 1/0006 |
| 2002/0125869 A1* | 9/2002 | Groom | H02M 3/1584 |
| | | | 323/283 |
| 2010/0109622 A1* | 5/2010 | Miki | H02M 3/1584 |
| | | | 323/272 |
| 2011/0057632 A1* | 3/2011 | Cheng | H02M 3/156 |
| | | | 323/234 |
| 2012/0068674 A1* | 3/2012 | Yu | H02M 3/1584 |
| | | | 323/271 |
| 2012/0091977 A1* | 4/2012 | Carroll | H02M 3/1584 |
| | | | 323/271 |
| 2013/0057239 A1* | 3/2013 | Kalje | H02M 3/1584 |
| | | | 323/271 |
| 2013/0169249 A1* | 7/2013 | Lee | H02M 3/1584 |
| | | | 323/272 |
| 2013/0307498 A1* | 11/2013 | Jiang | G05F 1/10 |
| | | | 323/271 |
| 2013/0307503 A1* | 11/2013 | Ouyang | G05F 1/10 |
| | | | 323/282 |
| 2014/0022684 A1* | 1/2014 | Jiang | H02M 3/1584 |
| | | | 361/93.1 |
| 2014/0375286 A1* | 12/2014 | Jiang | H02M 1/14 |
| | | | 323/271 |
| 2015/0236586 A1* | 8/2015 | Babazadeh | H02M 1/32 |
| | | | 323/272 |
| 2015/0236595 A1* | 8/2015 | Babazadeh | H02M 3/157 |
| | | | 323/272 |
| 2015/0270773 A1* | 9/2015 | Jiang | H02M 1/32 |
| | | | 323/234 |
| 2015/0311798 A1* | 10/2015 | Yuan | H02M 3/156 |
| | | | 323/288 |
| 2016/0164414 A1* | 6/2016 | Hang | H02M 3/1584 |
| | | | 323/271 |
| 2018/0191333 A1* | 7/2018 | Chen | H03K 7/08 |
| 2018/0269787 A1* | 9/2018 | Chen | H02M 3/156 |
| 2018/0337599 A1* | 11/2018 | Chen | H02M 3/158 |
| 2019/0074770 A1* | 3/2019 | Trichy | H02M 3/1584 |
| 2019/0207518 A1* | 7/2019 | Wu | G01R 29/033 |
| 2020/0007023 A1* | 1/2020 | Wu | H02M 3/1584 |
| 2020/0044553 A1* | 2/2020 | Guo | G01R 31/42 |
| 2020/0395854 A1* | 12/2020 | Yao | H02M 1/32 |
| 2020/0403494 A1* | 12/2020 | Lu | H02M 1/32 |
| 2020/0403495 A1* | 12/2020 | Lu | H02M 3/1563 |
| 2021/0028683 A1* | 1/2021 | Jiang | H02M 1/084 |
| 2021/0028686 A1* | 1/2021 | Jiang | H02M 3/1584 |
| 2021/0028704 A1* | 1/2021 | Jiang | H02M 3/1584 |
| 2021/0288578 A1* | 9/2021 | Luo | H02M 1/088 |
| 2021/0288580 A1* | 9/2021 | Luo | H02M 3/1584 |
| 2021/0384829 A1* | 12/2021 | Li | H02M 1/088 |
| 2021/0399641 A1* | 12/2021 | Lee | H02M 1/08 |
| 2022/0190722 A1* | 6/2022 | Zhang | H02M 1/0032 |
| 2022/0247316 A1* | 8/2022 | Jiang | H02M 3/1584 |
| 2022/0247317 A1* | 8/2022 | Jiang | H02M 3/1584 |
| 2022/0345126 A1* | 10/2022 | Harriman | H03K 17/145 |
| 2023/0048949 A1* | 2/2023 | Nguyen | H02M 1/0043 |
| 2023/0188033 A1* | 6/2023 | Chen | H02M 3/33507 |
| | | | 363/21.01 |
| 2023/0238875 A1* | 7/2023 | Yang | H02M 3/1586 |
| | | | 363/13 |
| 2023/0299671 A1* | 9/2023 | Zhao | H02M 3/1566 |
| | | | 323/282 |
| 2023/0299679 A1* | 9/2023 | Li | H02M 1/088 |
| 2023/0336082 A1* | 10/2023 | Dai | H02M 3/1586 |
| 2024/0063720 A1* | 2/2024 | Yang | H02M 1/088 |
| 2024/0128854 A1* | 4/2024 | D'Souza | H02M 1/08 |
| 2024/0128856 A1* | 4/2024 | D'Souza | H02M 3/158 |
| 2024/0348147 A1* | 10/2024 | Li | H02M 1/4233 |

* cited by examiner

MULTIPHASE SWITCHING CONVERTER WITH FAULT DETECTION AND FAULT DETECTION METHOD THEREOF

CROSS-REFERENCE TO RELATED APPLICATIONS

This application claims the benefit of CN application 202211440301.7, filed on Nov. 17, 2022, and incorporated herein by reference.

TECHNICAL FIELD OF THE INVENTION

The present invention generally relates to electronic circuits, and more particularly but not exclusively, to multiphase switching converters and associated fault detection methods.

BACKGROUND OF THE INVENTION

Multiphase switching converters have been widely used due to their superior performance. In order to optimize the efficiency of multiphase switching converters, auto-phase shedding is usually performed, where the number of switching circuits under power operation is determined based on the magnitude of a load current. For example, as the load current increases, the multiphase switching converter may work in different working modes, such as one-phase DCM (Discontinuous Conduction Mode), one-phase CCM (Continuous Conduction Mode) or multiphase CCM. In some applications that require high reliability, such as a CPU power supply, it is very important to accurately detect which switching circuit is in a fault condition, and then to take measures to make the entire circuit continue to work. Therefore, when the multiphase switching converter works in different working modes, how to quickly and accurately detect whether a switching circuit of the multiphase switching converter is in the fault condition is an urgent problem to be solved.

SUMMARY OF THE INVENTION

An embodiment of the present invention discloses a controller for a multiphase switching converter, where the multiphase switching converter has a plurality of switching circuits. The controller includes a plurality of comparing units, a plurality of duration detecting units, a mode determining circuit, a plurality of fault determining units and a switch control circuit. The plurality of comparing units are configured to provide a plurality of comparing signals, where each of the plurality of comparing units is configured to receive a corresponding current sensing signal indicative of a current flowing through a corresponding switching circuit, and to provide a corresponding comparing signal by comparing the corresponding current sensing signal with a corresponding current reference signal. The plurality of duration detecting units are configured to provide a plurality of duration detecting signals, where each of the plurality of duration detecting units is configured to receive the corresponding comparing signal and to provide a corresponding duration detecting signal by detecting the duration of the corresponding comparing signal keeping in a first state. The mode determining circuit is configured to provide a plurality of first mode signals and a plurality of second mode signals, where each of the plurality of first mode signals is configured to indicate whether the corresponding switching circuit is under power operation, and where each of the plurality of second mode signals is configured to indicate whether the corresponding switching circuit works in DCM or CCM. The plurality of fault determining units are configured to provide a plurality of fault signals, where each of the plurality of fault determining units is configured to receive the corresponding duration detecting signal, the corresponding first mode signal and the corresponding second mode signal, and to provide a corresponding fault signal based on the corresponding duration detecting signal, the corresponding first mode signal and the corresponding second mode signal. The switch control circuit is configured to receive the plurality of fault signals, and to provide a plurality of switch control signals to respectively control the plurality of switching circuits based on the plurality of fault signals.

An embodiment of the present invention discloses a multiphase switching converter. The multiphase switching converter includes a plurality of switching circuits, a plurality of comparing units, a plurality of duration detecting units, a mode determining circuit, a plurality of fault determining units and a switch control circuit. The plurality of comparing units are configured to provide a plurality of comparing signals, where each of the plurality of comparing units is configured to receive a corresponding current sensing signal indicative of a current flowing through a corresponding switching circuit, and to provide a corresponding comparing signal by comparing the corresponding current sensing signal with a corresponding current reference signal. The plurality of duration detecting units are configured to provide a plurality of duration detecting signals, where each of the plurality of duration detecting units is configured to receive the corresponding comparing signal and to provide a corresponding duration detecting signal by detecting the duration of the corresponding comparing signal keeping in a first state. The mode determining circuit is configured to provide a plurality of first mode signals and a plurality of second mode signals, where each of the plurality of first mode signals is configured to indicate whether the corresponding switching circuit is under power operation, and where each of the plurality of second mode signals is configured to indicate whether the corresponding switching circuit works in DCM or CCM. The plurality of fault determining units are configured to provide a plurality of fault signals, where each of the plurality of fault determining units is configured to receive the corresponding duration detecting signal, the corresponding first mode signal and the corresponding second mode signal, and to provide a corresponding fault signal based on the corresponding duration detecting signal, the corresponding first mode signal and the corresponding second mode signal. The switch control circuit is configured to receive the plurality of fault signals, and to provide a plurality of switch control signals to respectively control the plurality of switching circuits based on the plurality of fault signals.

An embodiment of the present invention discloses a fault detection method for multiphase switching converter, where the multiphase switching converter includes a plurality of switching circuits. The fault detection method includes the following steps. 1) Generating a corresponding comparing signal by comparing a corresponding current reference signal with a corresponding current sensing signal indicative of a current flowing through a corresponding switching circuit. 2) Generating a corresponding duration detecting signal by detecting the duration of the corresponding comparing signal keeping in a first state. 3) Generating a corresponding first mode signal indicating whether the corresponding switching circuit is under power operation and a corresponding second mode signal indicating whether the corresponding switching circuit works in DCM or CCM. And 4) generating a fault signal indicating whether the corresponding switching circuit is in a fault condition based on the corresponding duration detecting signal, the corresponding first mode signal and the corresponding second mode signal.

BRIEF DESCRIPTION OF DRAWINGS

The present invention can be further understood with reference to the following detailed description and the appended drawings, wherein like elements are provided with like reference numerals.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Reference to "one embodiment", "an embodiment", "an example" or "examples" means: certain features, structures, or characteristics are contained in at least one embodiment of the present invention. These "one embodiment", "an embodiment", "an example" and "examples" are not necessarily directed to the same embodiment or example. Furthermore, the features, structures, or characteristics may be combined in one or more embodiments or examples. In addition, it should be noted that the drawings are provided for illustration, and are not necessarily to scale. And when an element is described as "connected" or "coupled" to another element, it can be directly connected or coupled to the other element, or there could exist one or more intermediate elements. In contrast, when an element is referred to as "directly connected" or "directly coupled" to another element, there is no intermediate element.

Figure 1:
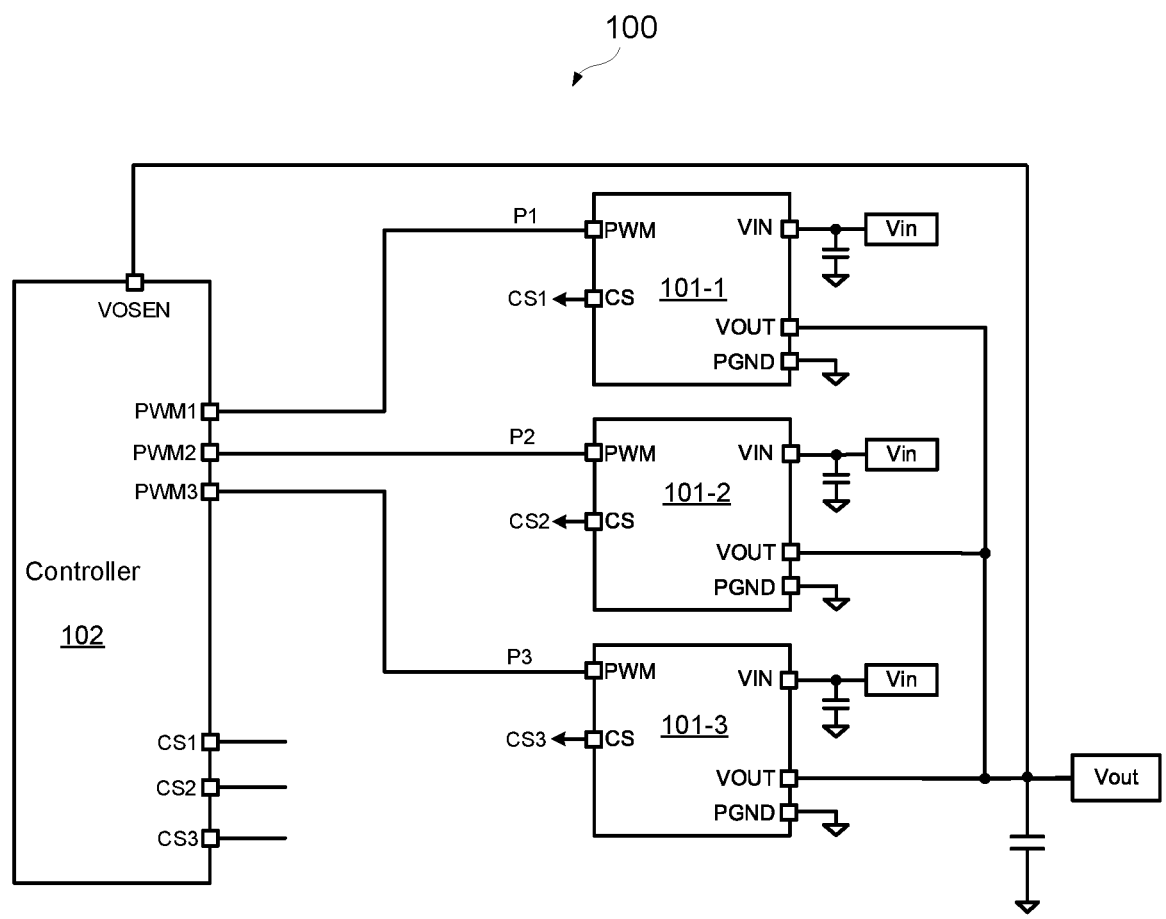
FIG. 1 illustrates a block diagram of a multiphase switching converter 100 in accordance with an embodiment of the present invention.

FIG. 1 illustrates a block diagram of a multiphase switching converter 100 in accordance with an embodiment of the present invention. The multiphase switching converter 100 includes a plurality of switching circuits 101 and a controller 102. The plurality of switching circuits 101 are coupled in parallel for converting an input voltage Vin to an output voltage Vout which is provided to a load (not shown). The plurality of switching circuits 101 may be configured in any DC/DC or AC/DC topology, such as synchronous or asynchronous BOOST and BUCK converter, Forward and Flyback converter and so on.

In the example shown in FIG. 1, the plurality of switching circuits 101 includes three switching circuits 101-1~101-3 to form a three-phase switching converter for illustration purpose. Those skilled in the art can understand that the plurality of switching circuits 101 may also include any number of switching circuits to form any other multiphase switching converter. In one embodiment, each of the plurality of switching circuit 101-$i$ ($i$=1, 2, 3) may be integrated in a single integrated circuit.

Each of the plurality of the switching circuits 101-$i$ has a plurality of pins, including a pin VIN for receiving the input voltage Vin, a pin VOUT for providing the output voltage Vout, a pin CS for reporting current information, and a pin PWM for receiving a switch control signal Pi. Each switching circuit 101-$i$ includes a power switch having a first terminal coupled to the pin VIN and a second terminal coupled to the pin VOUT through an energy storage element. In one embodiment, the current information includes a current flowing through the power switch or the energy storage element of the corresponding switching circuit 101-$i$.

In the example shown in FIG. 1, the controller 102 has a plurality of pins, including pins CS1~CS3 for receiving the current information of the switching circuits 101-1~101-3 respectively, pins PWM1~PWM3 for providing switch control signals P1~P3 respectively, and a pin VOSEN for detecting the output voltage Vout. The pins CS1~CS3 of the controller 102 are respectively coupled to the pin CS of the switching circuits 101-1~101-3, to receive the current information, respectively.

Figure 2:
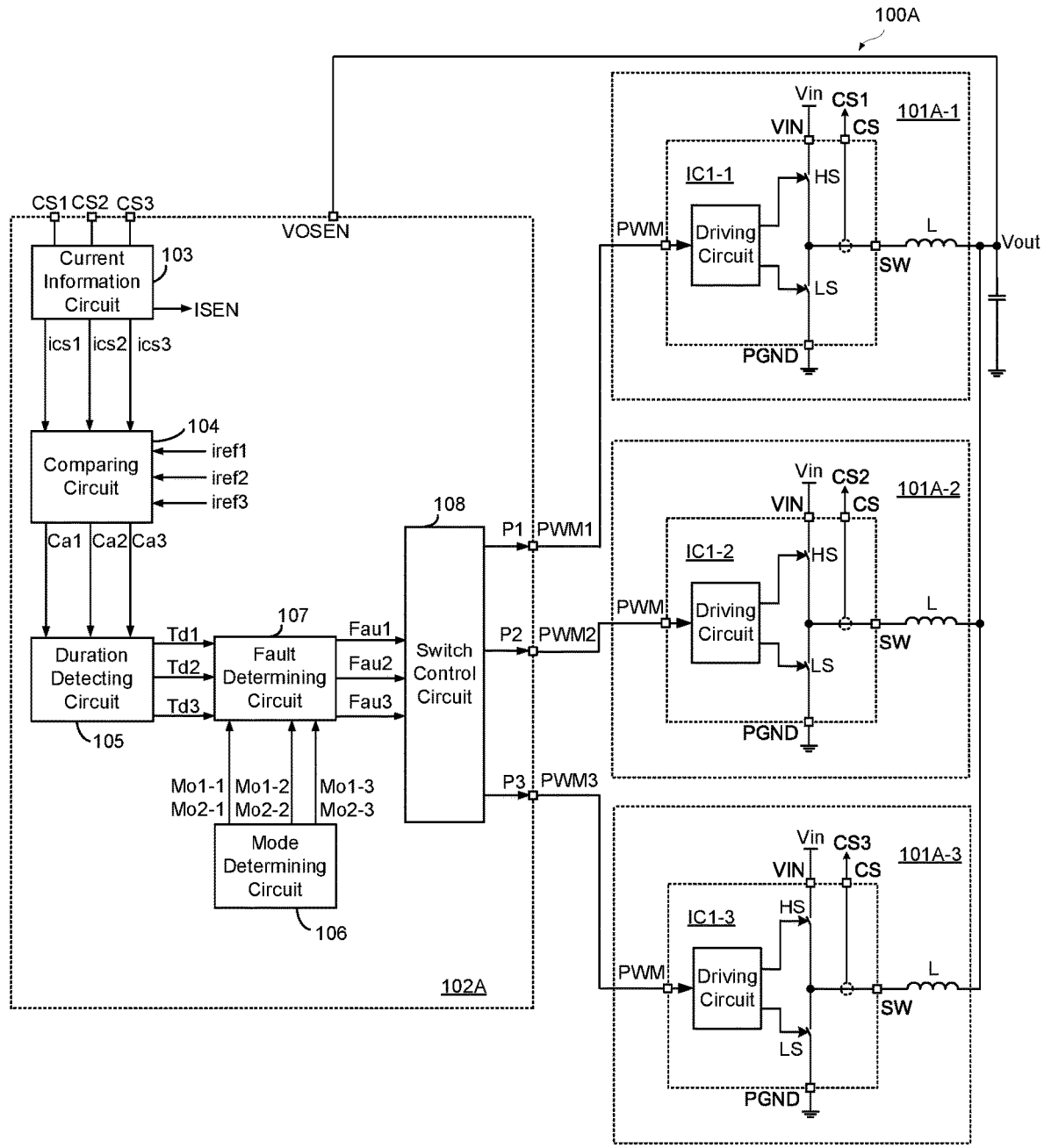
FIG. 2 illustrates a circuit schematic of a multiphase switching converter 100A in accordance with an embodiment of the present invention.

FIG. 2 illustrates a circuit schematic of a multiphase switching converter 100A in accordance with another embodiment of the present invention. As shown in FIG. 2, the multiphase switching converter 100A includes a plurality of switching circuits 101A and a controller 102A. The plurality of switching circuits 101A are coupled in parallel for converting an input voltage Vin to an output voltage Vout. In the example shown in FIG. 2, the plurality of switching circuits 101A includes three switching circuits 101A-1~101A-3. Those skilled in the art can understand that the plurality of switching circuits 101A may include any number of the switching circuits.

Each of the plurality of switching circuit 101A-$i$ may be configured to have same circuit topology. In one embodiment, each of the plurality of switching circuit 101A-$i$ includes at least one power switch (e.g., a high side power switch HS and a low side power switch LS) and a driving circuit for driving the power switch. In one embodiment, the high side power switch HS, the low side switch LS and the driving circuit may be integrated in a single integrated circuit IC1-*i*. The integrated circuit IC1-*i* includes a pin VIN for receiving an input voltage Vin, a pin SW connecting to a common terminal of the high side switch HS and the low side switch LS, a pin CS for reporting current information and a pin PWM for receiving a switch control signal Pi. In the example shown in FIG. 2, each of the plurality of switching circuits 101A-i further includes an inductor L, where a first terminal of the inductor L is coupled to the pin SW of the corresponding integrated circuit IC1-I. The second terminals of the plurality of inductors are coupled together.

In the example shown in FIG. 2, the controller 102A has pins CS1~CS3 for receiving the current information respectively, a pin VOSEN for receiving a signal indicative of the output voltage Vout, and pins PWM1~PWM3 for providing switch control signals P1~P3 respectively. The controller 102A further includes a current information circuit 103, a comparing circuit 104, a duration detecting circuit 105, a mode determining circuit 106, a fault determining circuit 107 and a switch control circuit 108.

The pins CS1~CS3 of the controller 102A are coupled to the pin CS of the switching circuits 101A-1~101A-3, to receive the current information of the switching circuits 101A-1~101A-3, respectively. The current information circuit 103 generates current sensing signals ics1~ics3, where each of the current sensing signals icsi indicates a current flowing through the power switch of the corresponding switching circuit 101A-i. In one embodiment, the current information circuit 103 further generates a load current signal ISEN indicative of a load current of the multiphase switching converter 100A. In one embodiment, the current information circuit 103 generates the load current signal ISEN by summing, filtering and scaling up/down the current sensing signals ics1~ics3.

In the example shown in FIG. 2, the comparing circuit 104 is coupled to the current information circuit 103 to receive the current sensing signals ics1~ics3, and compares the current sensing signals ics1~ics3 with current reference signals iref1~iref3 respectively, to generate comparing signals Ca1~Ca3, where each of the comparing signals Cai has a first state (e.g. logic high state) and a second state (e.g. logic low state).

The duration detecting circuit 105 is coupled to the comparing circuit 104 to receive the comparing signals Ca1~Ca3, detects the duration of the comparing signals Ca1~Ca3 keeping in the first state respectively, and generates duration detecting signals Td1~Td3 based on corresponding detecting results. In one embodiment, each of the duration detecting signals Tdi is a value indicative of the duration of the corresponding comparing signal Cai keeping in the first state. In another embodiment, each of the duration detecting signals Tdi is a pulse signal, where the pulse width of the pulse signal represents the duration of the corresponding comparing signal Cai keeping in the first state.

The mode determining circuit 106 generates first mode signals Mo1-1~Mo1-3 and second mode signals Mo2-1~Mo2-3, where each of the first mode signals Mo1-*i* (i=1, 2, 3) indicates whether the corresponding switching circuit 101A-i is under power operation, and each of the second mode signals Mo2-*i* indicates whether the corresponding switching circuit 101A-i works in DCM or CCM. In one embodiment, each of the first mode signals Mo1-*i* and each of the second mode signals Mo2-*i* are one-bit digital data stored in register.

In one embodiment, the mode determining circuit 106 generates the first mode signals Mo1-1~Mo1-3 and the second mode signals Mo2-1~Mo2-3 based on a command. For example, the multiphase switching converter 100A determines whether each switching circuit 101A-i is under power operation and determines whether each switching circuit 101A-i works in DCM or CCM based on a command provided by a CPU or GPU.

| Condition | Working Mode |
| --- | --- |
| ISEN > Vth_3ph + VHYS | 3 phase CCM |
| Vth_2ph + VHYS < ISEN ≤ Vth_3ph | 2 phase CCM |
| Vth_1ph + VHYS < ISEN ≤ Vth_2ph | 1 phase CCM |
| ISEN ≤ Vth_1ph | 1 phase DCM or multiphase DCM |

In another embodiment, the mode determining circuit 106 generates the first mode signals Mo1-1~Mo1-3 and the second mode signals Mo2-1~Mo2-3 based on the load current signal ISEN. For example, the mode determining circuit 106 compares the load current signal ISEN with threshold voltages Vth_1*ph*~Vth_3*ph*, respectively, to determine whether each switching circuit 101A-i is under power operation and to determine whether each switching circuit 101A-i works in DCM or CCM. In a further embodiment, the comparison between the load current signal ISEN and threshold voltages Vth_1*ph*~Vth_3*ph* includes hysteresis comparison. According to the comparison results, the multiphase switching converter 100A may be configured to work in different working modes as shown in the table above, where VHYS is a hysteresis voltage.

The fault determining circuit 107 is coupled to the duration detecting circuit 105 to receive the duration detecting signals Td1~Td3 and is further coupled to the mode determining circuit 106 to receive the first mode signals Mo1-1~Mo1-3 and the second mode signals Mo2-1~Mo2-3. The fault determining circuit 107 generates fault signals Fau1~Fau3 based on the duration detecting signals Td1~Td3, the first mode signals Mo1-1~Mo1-3 and the second mode signals Mo2-1~Mo2-3, where each of the fault signals Faui indicates whether the corresponding switching circuit 101A-i is in a fault condition.

The switch control circuit 108 is coupled to the fault determining circuit 107 to receive the fault signals Fau1~Fau3 and generates the switch control signals P1~P3 to control the power operation of the switching circuits 101A-1~101A-3 based on the fault signals Fau1~Fau3, respectively.

Those skilled in the art can understand, the circuit shown in FIG. 2 is an exemplary illustration, other suitable topologies are also applicable. The abovementioned fault condition may include one or more of over voltage, over current, over temperature, under voltage, transistor failure, and so on.

Figure 3:
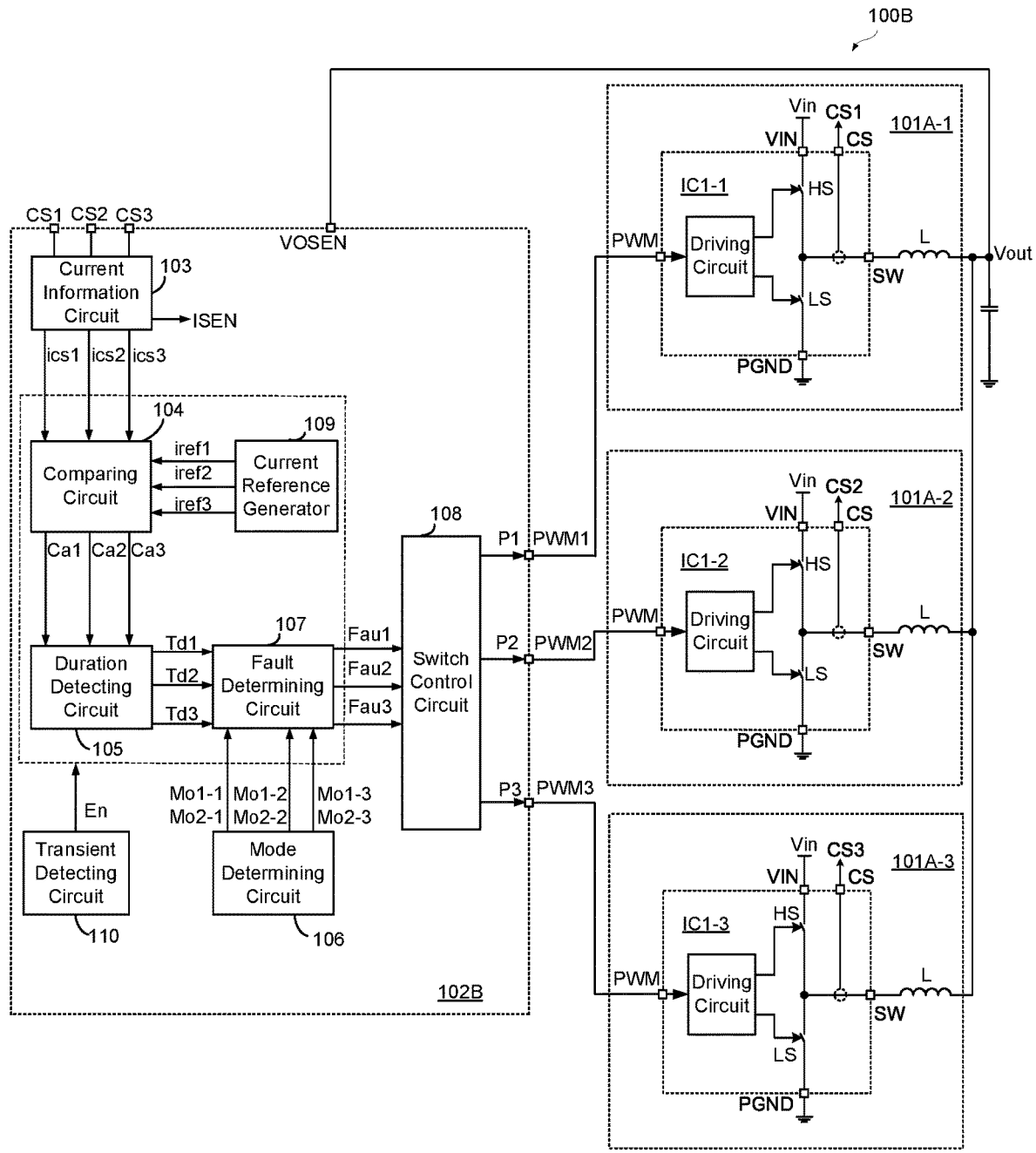
FIG. 3 illustrates a circuit schematic of a multiphase switching converter 100B in accordance with another embodiment of the present invention.

FIG. 3 illustrates a circuit schematic of a multiphase switching converter 100B in accordance with another embodiment of the present invention. Different from the controller 102A shown in FIG. 2, a controller 102B shown in FIG. 3 further includes a current reference generator 109 for generating the current reference signals iref1~irefN. In one embodiment, the current reference signals iref1~irefN may be preset based on practical applications. In another embodiment, the current reference signals iref1~irefN may be updated in real time based on the power operation of the multiphase switching converter 100B.

The controller 102B further includes a transient detecting circuit 110 for generating an enable signal En. When the transient detecting circuit 110 detects that the multiphase switching converter 100B is in a transient state, the enable signal En is invalid, and the fault detection function is disabled based on the enable signal En. In one embodiment, when the enable signal En is invalid, the fault signals Fau1~Fau3 are disabled. In another embodiment, when the enable signal En is invalid, the comparing circuit 104, the duration detecting circuit 105, the fault determining circuit 107, and the current reference generator 109 are configured to be disabled. In one embodiment, the transient state of the multiphase switching converter 100B refers to that the load current rapidly changes and a period of time after the change.

Figure 4:
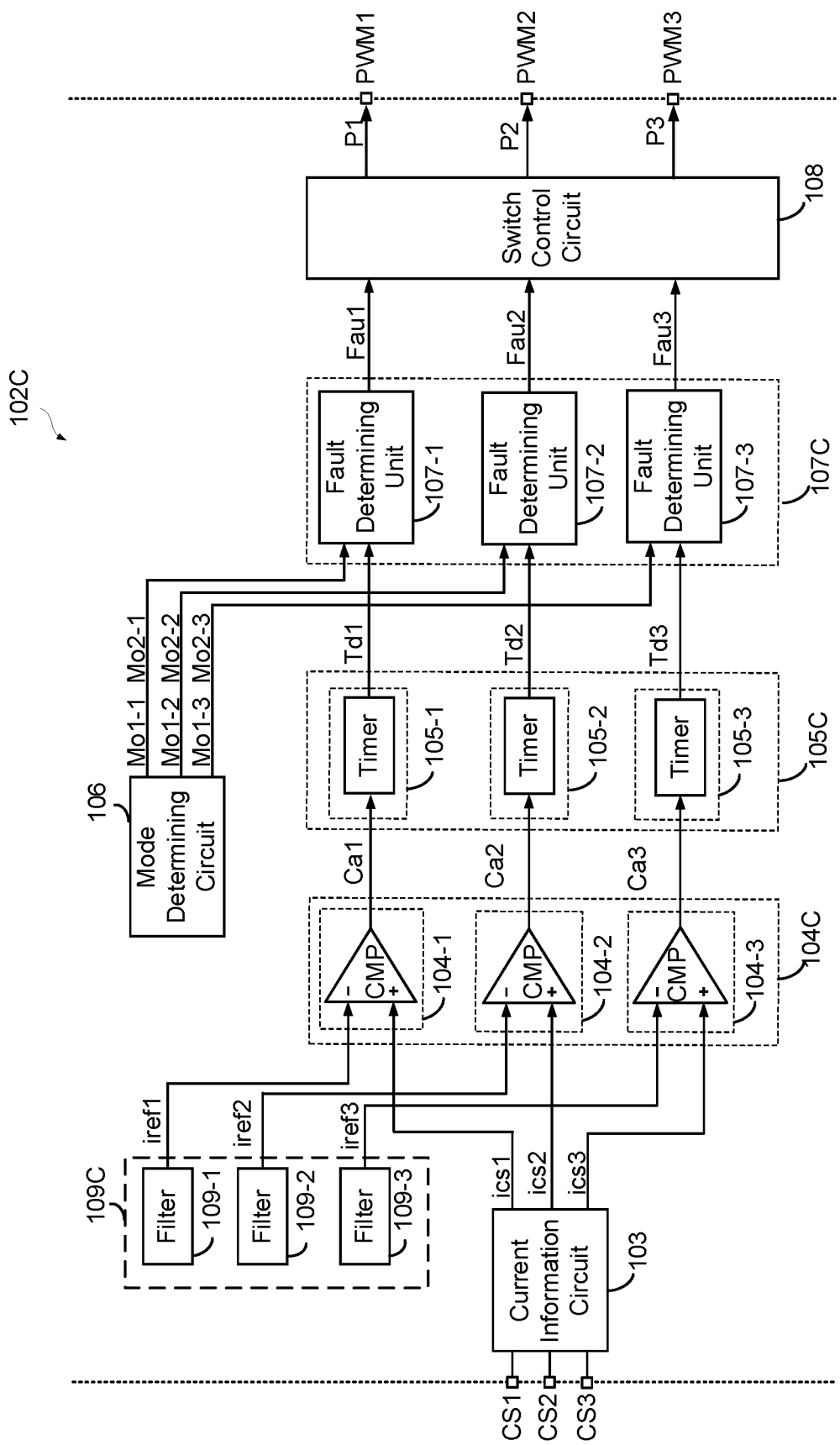
FIG. 4 illustrates a circuit schematic of a controller 102C in accordance with an embodiment of the present invention.

FIG. 4 illustrates a circuit schematic of a controller 102C in accordance with an embodiment of the present invention. In the example shown in FIG. 4, pins CS1~CS3 of the controller 102C receive the current information of the switching circuits 101-1~101-3 (shown in FIG. 1). The current information circuit 103 generates the current sensing signals ics1~ics3 respectively indicative of the current flowing through the switching circuits 101-1~101-3.

The comparing circuit 104C includes a plurality of comparing units 104-1~104-3, and each of the plurality of comparing units 104-$i$ compares the corresponding current sensing signal icsi with the corresponding current reference signal irefi to generate the comparing signal Cai. In one embodiment, each of the plurality of comparing units 104-$i$ includes a comparator CMP. In a further embodiment, a non-inverting input terminal of the comparator CMP receives the current sensing signal icsi, and an inverting input terminal of the comparator CMP receives the current reference signal irefi, where when the current sensing signal icsi is higher than the current reference signal irefi, the comparing signal Cai has a first state (e.g., logic high state); when the current sensing signal icsi is lower than the current reference signal irefi, the comparing signal Cai has a second state (e.g., logic low state).

The duration detecting circuit 105C includes a plurality of duration detecting units 105-1~105-3, each of the plurality of duration detecting units 105-$i$ is coupled to the corresponding comparing unit 104-$i$ to receive the comparing signal Cai and detects the duration of the comparing signal Cai keeping in the first state to generate the duration detecting signal Tdi. In one embodiment, each of the plurality of duration detecting units 105-$i$ includes a timer, which times the duration of the comparing signal Cai keeping in the first state.

The mode determining circuit 106 generates the plurality of first mode signal Mo1-1~Mo1-3 and the plurality of second mode signal Mo2-1~Mo2-3. Where each of the plurality of first mode signals Mo1-$i$ indicates whether the corresponding switching circuit 101-$i$ is under power operation, and each of the plurality of second mode signals Mo2-$i$ indicates whether the corresponding switching circuit 101-$i$ works in DCM or CCM.

The fault determining circuit 107C includes a plurality of fault determining units 107-1~107-3, and each of the plurality of fault determining units 107-$i$ is coupled to the corresponding duration detecting unit 105-$i$ to receive the duration detecting signal Tdi, and is further coupled to the mode determining circuit 106 to receive the corresponding first mode signal Mo1-$i$ and the corresponding second mode signal Mo2-$i$. The fault determining unit 107-$i$ generates the fault signal Faui based on the duration detecting signal Tdi, the first mode signal Mo1-$i$ and the second mode signal Mo2-$i$.

When the first mode signal Mo1-$i$ indicates that the corresponding switching circuit 101-$i$ is under power operation, and the second mode signal Mo2-$i$ indicates that the corresponding switching circuit 101-$i$ works in CCM, the fault determining unit 107-$i$ compares the duration detecting signal Tdi with a first time threshold Tth1 and a second time threshold Tth2 respectively, and determines whether the corresponding switching circuit 101-$i$ is in the fault condition based on the comparison results. When the first mode signal Mo1-$i$ indicates that the corresponding switching circuit 101-$i$ is under power operation, and the second mode signal Mo2-$i$ indicates that the corresponding switching circuit 101-$i$ works in DCM, the fault determining unit 107-$i$ compares the duration detecting signal Tdi with the first time threshold Tth1 and a third time threshold Tth3 respectively, and determines whether the corresponding switching circuit 101-$i$ is in the fault condition based on the comparison results. In one embodiment, each fault determining unit 107-$i$ includes a comparator.

In one embodiment, each of the plurality of fault determining units 107-$i$ further receives a switching cycle signal Tsi and generates a duty cycle signal Di by calculating a ratio of the duration detecting signal Tdi to the switching cycle signal Tsi. The fault determining unit 107-$i$ generates the fault signal Faui based on the duty cycle signal Di, the first mode signal Mo1-$i$ and the second mode signal Mo2-$i$, where the switching cycle signal Tsi represents the switching cycle of the corresponding switching circuit 101-$i$ when the switching circuit 101-$i$ works in CCM. In one embodiment, switching cycle signals Ts1~Ts3 of the switching circuits 101-1~101-3 are the same.

In one embodiment, the duration detecting signal Tdi is an average value of the duration of the comparing signal Cai keeping in the first state within a plurality of switching cycles. For example, when the switching circuit 101-$i$ is under power operation, a plurality of duration signals are generated within a plurality of switching cycles, and the plurality of duration signals are filtered by a moving average filter to generate the duration detecting signal Tdi, where each of the plurality of duration signals represents the duration of the comparing signal Cai keeping in the first state within a corresponding switching cycle.

The switch control circuit 108 is coupled to the fault determining circuit 107 to receive the fault signals Fau1~Fau3 and generates switch control signals P1~P3 to control the operation of the switching circuits 101-1~101-3 based on the fault signals Fau1~Fau3, respectively.

In the example shown in FIG. 4, the current reference generator 109C includes a plurality of filters 109-1~109-3, and each of the plurality of filters 109-$i$ generates the current reference signal irefi by filtering out high frequency component of the corresponding current sensing signal icsi.

In one embodiment, for a N-phase switching converter, the comparing circuit 104, the duration detecting circuit 105, the fault determining circuit 107, and the current reference generator 109 all have N subunits in a one-to-one correspondence with N switching circuits of the N-phase switching converter. For example, the comparing circuit 104 includes N comparing units 104-1~104-N. Each comparing unit 104-$i$ receives the corresponding current sensing signals icsi of the i-th switching circuit and generates the comparing signals Cai. The fault determining circuit 107 includes N fault determining units 107-1~107-N, and each fault determining unit 107-$i$ determines whether the i-th switching circuit is in the fault condition.

In another embodiment, the aforementioned circuits have less than N subunits. For example, the fault determining circuit 107 includes M fault determining units 107-1~107-M, where M is smaller than N. The M fault determining units 107-1~107-M determine whether the N switching circuits are in the fault condition by time-division multiplexing.

Figure 5:
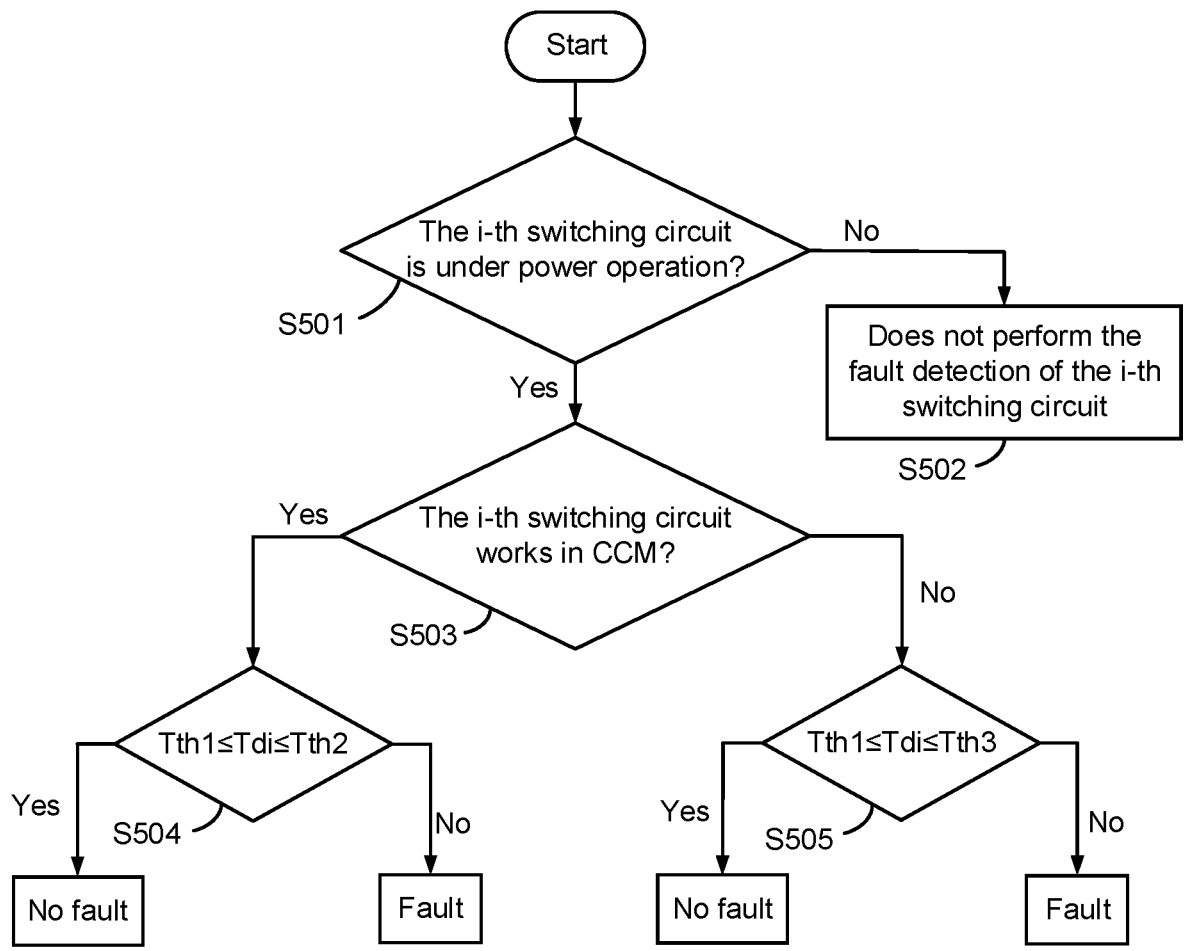
FIG. 5 illustrates a working flowchart of the fault detecting unit 107-$i$ shown in FIG. 4 in accordance with an embodiment of the present invention.

FIG. 5 illustrates a working flowchart of the fault determining unit 107-$i$ shown in FIG. 4 in accordance with an embodiment of the present invention. As shown in FIG. 5, the working flowchart includes steps S501~S505.

At step S501, it is determined whether the i-th switching circuit is under power operation, if so, go to step S503; otherwise, go to step S502.

At step S502, the fault detection of the i-th switching circuit is not performed.

At step S503, it is determined whether the i-th switching circuit works in CCM, if so, go to step S504; otherwise, go to step S505.

At step S504, it is determined whether the duration detecting signal Tdi is between the first time threshold Tth1 and the second time threshold Tth2, if so, the i-th switching circuit is not in the fault condition; otherwise, the i-th switching circuit is in the fault condition.

At step S505, the i-th switching circuit works in DCM, and it is determined whether the duration detecting signal Tdi is between the first time threshold Tth1 and the third time threshold Tth3, if so, the i-th switching circuit is not in the fault condition; otherwise, the i-th switching circuit is in the fault condition.

In one embodiment, the first time threshold Tth1=tc-tto, the second time threshold Tth2=tc+tto, and the third time threshold Tth3=2*tc, where the time reference tc=½*Tsi, the switching cycle signal Tsi represents the switching cycle of the corresponding switching circuit working in CCM. The switching cycle signal Tsi can be preset based on practical applications and can also be updated in real time based on the power operation of the multiphase switching converter. The time offset tto can be set based on practical applications and can also be changed by programming.

In one embodiment, switching cycle signals Ts1~Ts3 of the switching circuits 101-1~101-3 are the same, thus the first time thresholds of the switching circuits 101-1~101-3 are the same, the second time thresholds of the switching circuits 101-1~101-3 are the same, and the third time thresholds of the switching circuits 101-1~101-3 are the same. For example, the first time threshold Tth1 of the switching circuit 101-1 and the first time threshold Tth1 of the switching circuit 101-2 are the same.

Figure 6:
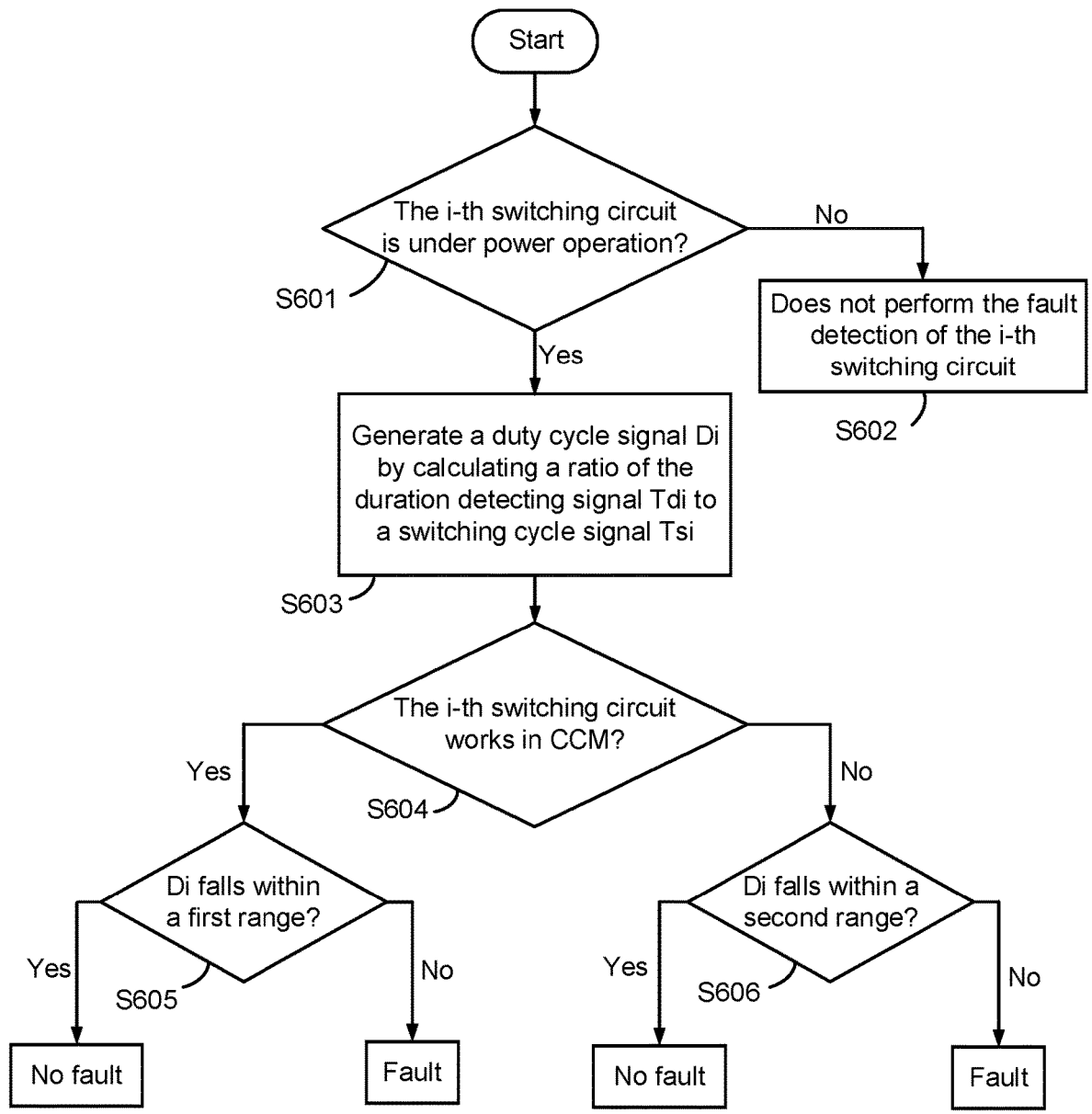
FIG. 6 illustrates a working flowchart of the fault detecting unit 107-$i$ shown in FIG. 4 in accordance with another embodiment of the present invention.

FIG. 6 illustrates a working flowchart of the fault determining unit 107-$i$ shown in FIG. 4 in accordance with another embodiment of the present invention. As shown in FIG. 6, the working flowchart includes steps S601~S606.

At step S601, it is determined whether the i-th switching circuit is under power operation, if so, go to step S603; otherwise, go to step S602.

At step S602, the fault detection of the i-th switching circuit is not performed.

At step S603, a duty cycle signal Di is generated based on a ratio of the duration detecting signal Tdi to a switching cycle signal Tsi.

At step S604, it is determined whether the i-th switching circuit works in CCM, if so, go to step S605; otherwise, go to step S606.

At step S605, it is determined whether the duty cycle signal Di falls within a first range, if so, the i-th switching circuit is not in the fault condition; otherwise, the i-th switching circuit is in the fault condition.

At step S606, the i-th switching circuit works in DCM, and it is determined whether the duty cycle signal Di falls within a second range, if so, the i-th switching circuit is not in the fault condition; otherwise, the i-th switching circuit is in the fault condition.

In one embodiment, the first range is $(0.5-\Delta, 0.5+\Delta)$, and the second range is $(0.5-\Delta, 1)$, where $\Delta$ can be set based on practical applications, or can be changed by programming.

Figure 7A:
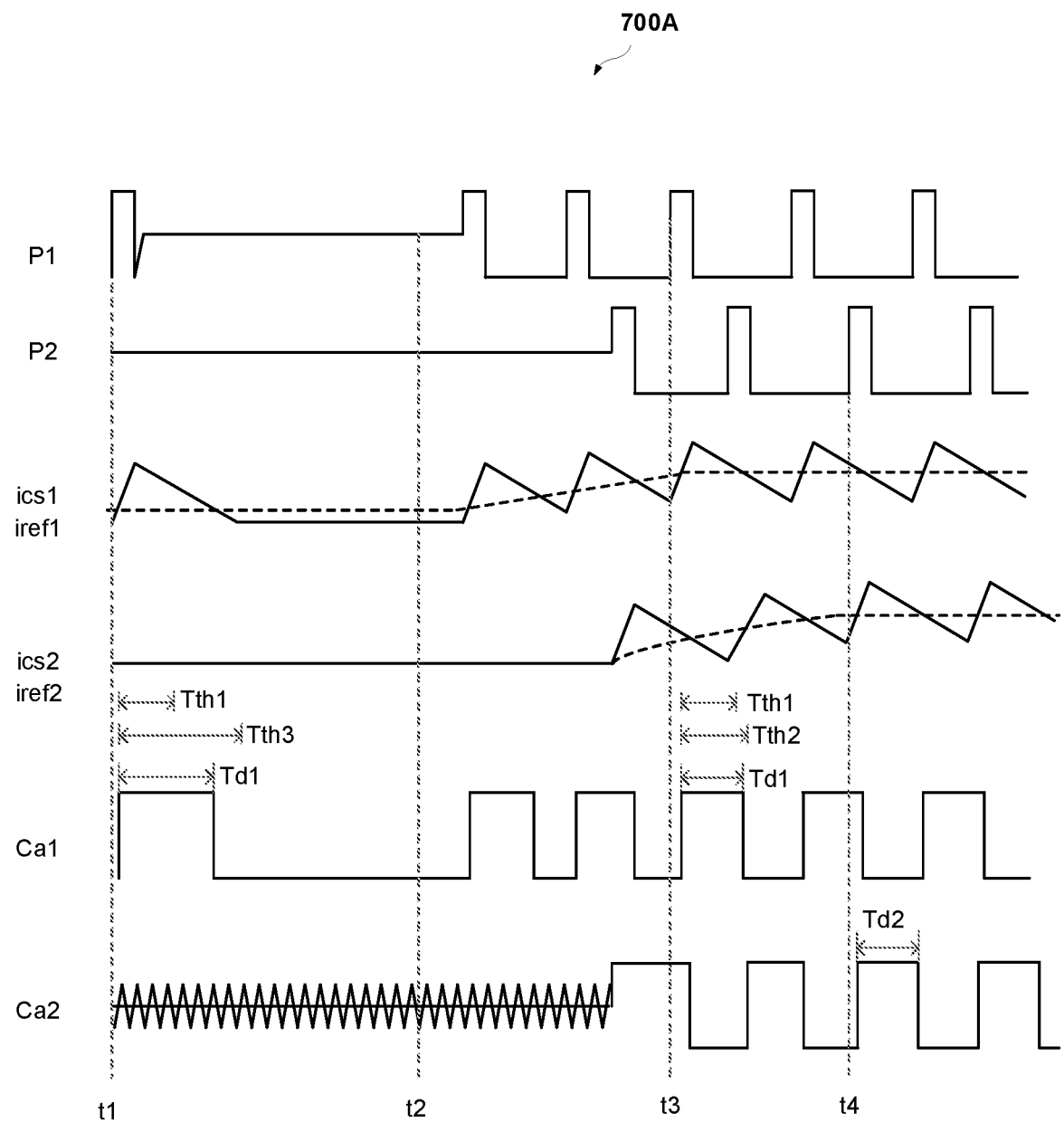
FIG. 7A illustrates working waveforms 700A of the multiphase switching converter 100 in accordance with an embodiment of the present invention.

FIG. 7A illustrates working waveforms 700A of the multiphase switching converter 100 in accordance with an embodiment of the present invention. FIG. 7A takes a two-phase switching converter as an example, the duration detecting signals Td1 and Td2 represent the duration of the comparing signals Ca1 and Ca2 keeping in the first state respectively.

As shown in FIG. 7A, during the time period t1~t2, a first switching circuit is under power operation and works in DCM and the duration detecting signal Td1 is between the first time threshold Tth1 and the third time threshold Tth3, thus it is determined that the first switching circuit is not in the fault condition.

After time t3, the first switching circuit works in CCM, and the duration detecting signal Td1 is between the first time threshold Tth1 and the second time threshold Tth2, thus it is determined that the first switching circuit is not in the fault condition.

Similarly, after time t4, a second switching circuit is under power operation and works in CCM and the duration detecting signal Td2 is between the first time threshold Tth1 and the second time threshold Tth2, thus it is determined that the second switching circuit is not in the fault condition.

Figure 7B:
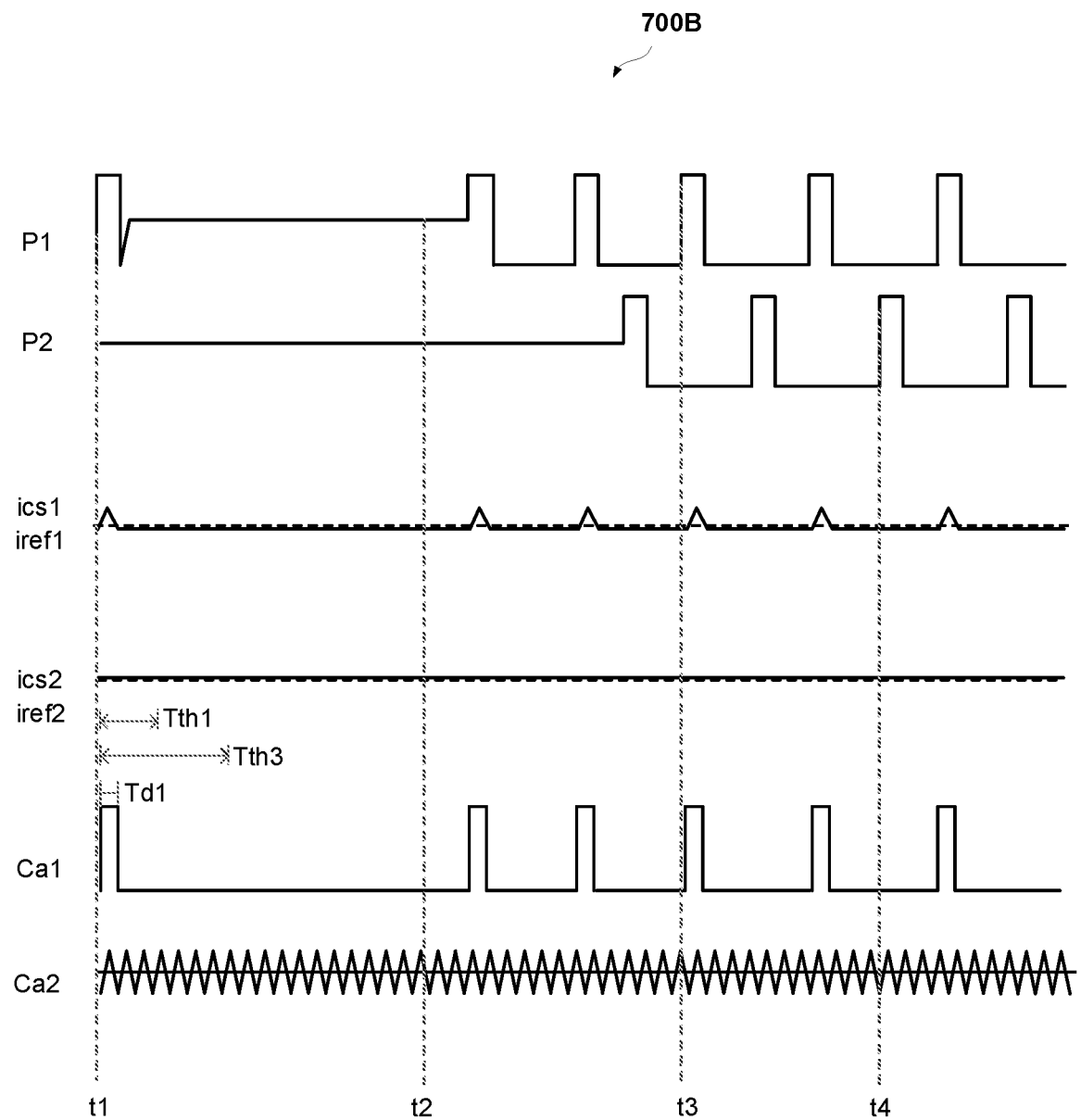
FIG. 7B illustrates working waveforms 700B of the multiphase switching converter 100 in accordance with another embodiment of the present invention.

FIG. 7B illustrates working waveforms 700B of the multiphase switching converter 100 in accordance with another embodiment of the present invention. The duration detecting signals Td1 and Td2 represent the duration of the comparing signals Ca1 and Ca2 keeping in the first state respectively.

As shown in FIG. 7B, during the time period t1~t2, the first switching circuit is under power operation and works in DCM, and the duration detecting signal Td1 is smaller than the first time threshold Tth1, thus it is determined that the first switching circuit is in the fault condition.

After time t4, the second switching circuit is under power operation and works in CCM. At the time, the duration detecting signal Td2 is zero, which is smaller than the first time threshold Tth1, thus it is determined that the second switching circuit is in the fault condition.

Figure 8:
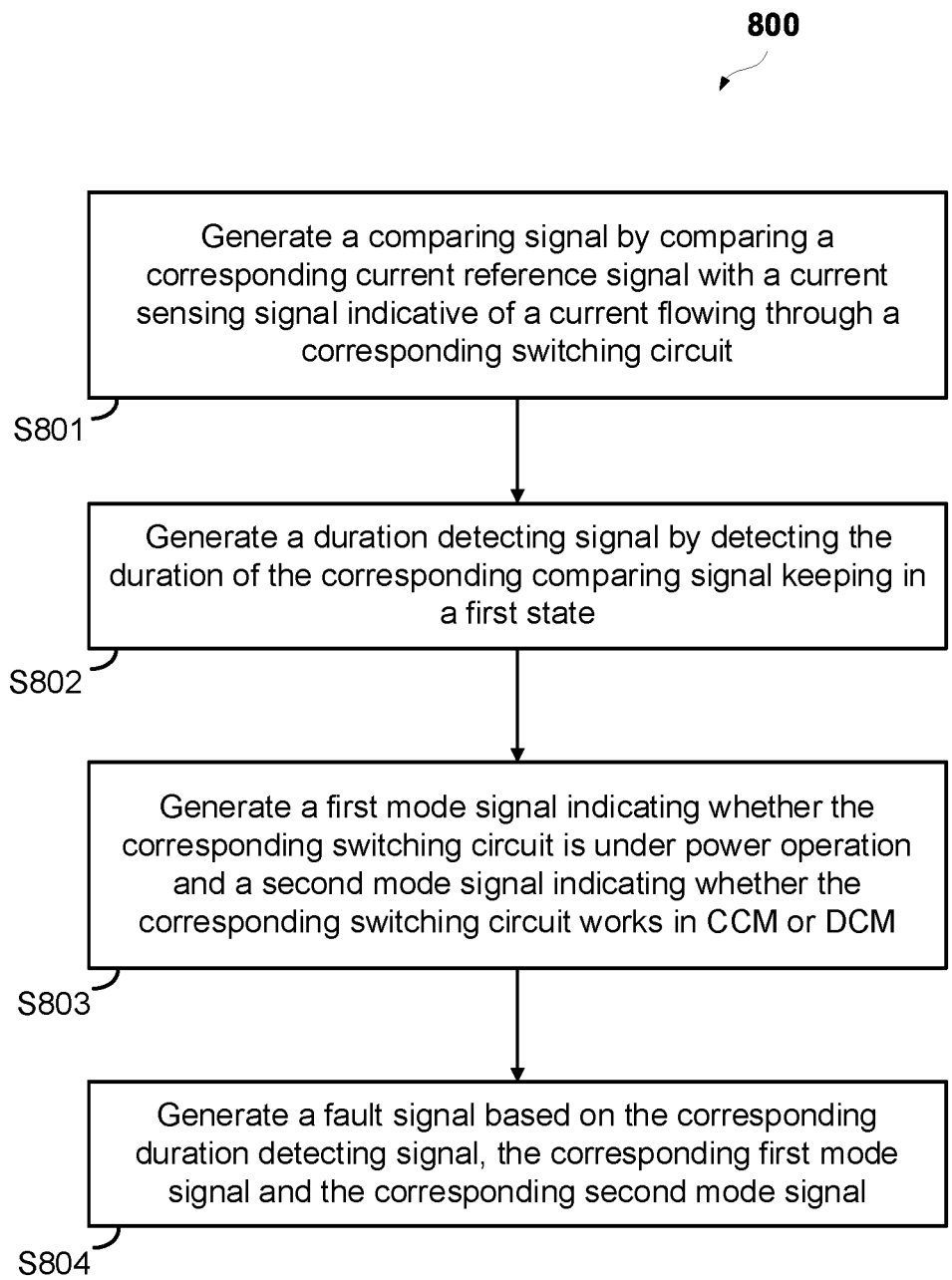
FIG. 8 illustrates a flowchart of a fault detection method 800 for a multiphase switching converter in accordance with an embodiment of the present invention.

FIG. 8 illustrates a flowchart of a fault detection method 800 for the multiphase switching converter 100 in accordance with an embodiment of the present invention. The multiphase switching converter 100 includes a plurality of switching circuits coupled in parallel to provide an output voltage. The fault detection method 800 includes steps S801~S804.

At step S801, a comparing signal is generated by comparing a corresponding current reference signal with a current sensing signal indicative of a current flowing through a corresponding switching circuit of the plurality of switching circuits.

At step S802, a duration detecting signal is generated by detecting the duration of the corresponding comparing signal keeping in a first state.

At step S803, a first mode signal indicating whether the corresponding switching circuit is under power operation and a second mode signal indicating whether the corresponding switching circuit works in DCM or CCM are generated.

At step S804, a fault signal is generated based on the corresponding duration detecting signal, the corresponding first mode signal and the corresponding second mode signal, to determine whether the corresponding switching circuit is in a fault condition.

Obviously, many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A controller for a multiphase switching converter, wherein the multiphase switching converter has a plurality of switching circuits, the controller comprising:
   a plurality of comparing units configured to provide a plurality of comparing signals, wherein each of the plurality of comparing units is configured to receive a corresponding current sensing signal indicative of a current flowing through a corresponding switching circuit of the plurality of switching circuits, and to provide a corresponding comparing signal by comparing the corresponding current sensing signal with a corresponding current reference signal;
   a plurality of duration detecting units configured to provide a plurality of duration detecting signals, wherein each of the plurality of duration detecting units is configured to receive the corresponding comparing signal and to provide a corresponding duration detecting signal by detecting a duration of the corresponding comparing signal staying in a first state;
   a mode determining circuit configured to provide a plurality of first mode signals and a plurality of second mode signals, wherein each of the plurality of first mode signals is configured to indicate whether the corresponding switching circuit is under power operation, and wherein each of the plurality of second mode signals is configured to indicate whether the corresponding switching circuit works in discontinuous conduction mode (DCM) or continues conduction mode (CCM);
   a plurality of fault determining units configured to provide a plurality of fault signals, wherein each of the plurality of fault determining units is configured to receive the corresponding duration detecting signal, the corresponding first mode signal and the corresponding second mode signal, and to provide a corresponding fault signal based on the corresponding duration detecting signal, the corresponding first mode signal and the corresponding second mode signal; and
   a switch control circuit configured to receive the plurality of fault signals, and to provide a plurality of switch control signals to control the plurality of switching circuits respectively based on the plurality of fault signals.

2. The controller of claim 1, wherein:
   when the corresponding switching circuit is under power operation and works in CCM, the corresponding fault determining unit is configured to compare the duration detecting signal with a first time threshold and a second time threshold respectively, and to determine whether the corresponding switching circuit is in a fault condition based on the comparison results.

3. The controller of claim 2, wherein:
   the first time threshold is equal to a difference between a time reference and a time offset; and
   the second time threshold is equal to a sum of the time reference and the time offset, wherein the time reference is half of a switching cycle of the corresponding switching circuit working in CCM.

4. The controller of claim 1, wherein:
   when the corresponding switching circuit is under power operation and works in DCM, the corresponding fault determining unit is configured to compare the duration detecting signal with a first time threshold and a third time threshold respectively, and to determine whether the corresponding switching circuit is in a fault condition based on the comparison results.

5. The controller of claim 4, wherein:
   the first time threshold is equal to a difference between a time reference and a time offset; and wherein
   the third time threshold is equal to twice the time reference, wherein the time reference is half of a switching cycle of the corresponding switching circuit working in CCM.

6. The controller of claim 1, further comprising:
   a current reference generator configured to provide the corresponding current reference signal by filtering the corresponding sensing signal.

7. The controller of claim 1, further comprising:
   a transient detecting circuit configured to detect whether the multiphase switching converter is in a transient state, and to disable fault determining results when the multiphase switching converter is in the transient state.

8. The controller of claim 1, wherein each of the plurality of fault determining units is further configured to receive a switching cycle signal indicative of a switching cycle of the corresponding switching circuit working in CCM, and to generate a corresponding duty cycle signal based on a ratio of the corresponding duration detecting signal to the switching cycle signal, wherein:
   when the corresponding switching circuit is under power operation and works in CCM, the corresponding fault determining unit is configured to compare whether the corresponding duty cycle signal falls within a first range, and to determine whether the corresponding switching circuit is in a fault condition based on the comparison result.

9. The controller of claim 8, wherein:
   when the corresponding switching circuit is under power operation and works in DCM, the corresponding fault determining unit is configured to compare whether the corresponding duty cycle signal falls within a second range, and to determine whether the corresponding switching circuit is in the fault condition based on the comparison result.

10. The controller of claim 1, wherein:
    the corresponding duration detecting signal is an average value of a plurality of duration detection values within a plurality of successive switching cycles, wherein each of the plurality of duration detection values is the duration of the corresponding comparing signal staying in the first state within a corresponding switching cycle.

11. A multiphase switching converter comprising:
    a plurality of switching circuits;

a plurality of comparing units configured to provide a plurality of comparing signals, wherein each of the plurality of comparing units is configured to receive a corresponding current sensing signal indicative of a current flowing through a corresponding switching circuit of the plurality of switching circuits, and to provide a corresponding comparing signal by comparing the corresponding current sensing signal with a corresponding current reference signal;

a plurality of duration detecting units configured to provide a plurality of duration detecting signals, wherein each of the plurality of duration detecting units is configured to receive the corresponding comparing signal and to provide a corresponding duration detecting signal by detecting a duration of the corresponding comparing signal staying in a first state;

a mode determining circuit configured to provide a plurality of first mode signals and a plurality of second mode signals, wherein each of the plurality of first mode signals is configured to indicate whether the corresponding switching circuit is under power operation, and wherein each of the plurality of second mode signals is configured to indicate whether the corresponding switching circuit works in discontinuous conduction mode (DCM) or continuous conduction mode (CCM);

a plurality of fault determining units configured to provide a plurality of fault signals, wherein each of the plurality of fault determining units is configured to receive the corresponding duration detecting signal, the corresponding first mode signal and the corresponding second mode signal, and to provide a corresponding fault signal based on the corresponding duration detecting signal, the corresponding first mode signal and the corresponding second mode signal; and a switch control circuit configured to receive the plurality of fault signals, and to provide a plurality of switch control signals to control the plurality of switching circuits respectively based on the plurality of fault signals.

12. The multiphase switching converter of claim 11, wherein:
when the corresponding switching circuit is under power operation and works in CCM, the corresponding fault determining unit is configured to compare the duration detecting signal with a first time threshold and a second time threshold respectively, and to determine whether the corresponding switching circuit is in a fault condition based on the comparison results.

13. The multiphase switching converter of claim 12, wherein:
the first time threshold is equal to a difference between a time reference and a time offset; and
the second time threshold is equal to a sum of the time reference and the time offset, wherein the time reference is half of a switching cycle of the corresponding switching circuit working in CCM.

14. The multiphase switching converter of claim 11, wherein:
when the corresponding switching circuit is under power operation and works in DCM, the corresponding fault determining unit is configured to compare the duration detecting signal with a first time threshold and a third time threshold respectively, and to determine whether the corresponding switching circuit is in a fault condition based on the comparison results.

15. The multiphase switching converter of claim 14, wherein:
the first time threshold is equal to a difference between a time reference and a time offset; and
the third time threshold is equal to twice the time reference, wherein the time reference is half of a switching cycle of the corresponding switching circuit working in CCM.

16. The multiphase switching converter of claim 11, wherein each of the plurality of fault determining units is further configured to receive a switching cycle signal indicative of a switching cycle of the corresponding switching circuit working in CCM, and to generate a corresponding duty cycle signal based on a ratio of the corresponding duration detecting signal to the switching cycle signal, wherein:
when the corresponding switching circuit is under power operation and works in CCM, the corresponding fault determining unit is configured to compare whether the corresponding duty cycle signal falls within a first range, and to determine whether the corresponding switching circuit is in a fault condition based on the comparison result.

17. The multiphase switching converter of claim 11, wherein:
the corresponding duration detecting signal is an average value of a plurality of duration detecting values within a plurality of successive switching cycles, wherein each of the plurality of duration detecting values is the duration of the corresponding comparing signal staying in the first state within a corresponding switching cycle.

18. A fault detection method for multiphase switching converter, wherein the multiphase switching converter has a plurality of switching circuits, the fault detection method comprising:
generating a corresponding comparing signal, out of a plurality of comparing signals, by comparing a corresponding current reference signal with a corresponding current sensing signal indicative of a current flowing through a corresponding switching circuit of the plurality of switching circuits;
generating a corresponding duration detecting signal, out of a plurality of duration detecting signals, by detecting a duration of the corresponding comparing signal staying in a first state;
generating a corresponding first mode signal, out of a plurality of first mode signals, indicating whether the corresponding switching circuit is under power operation and a corresponding second mode signal, out of a plurality of second mode signals, indicating whether the corresponding switching circuit works in discontinuous conduction mode (DCM) or continuous conduction mode (CCM);
generating a corresponding fault signal, out of a plurality of fault signals, indicating whether the corresponding switching circuit is in a fault condition based on the corresponding duration detecting signal, the corresponding first mode signal and the corresponding second mode signal; and
generating a plurality of switch control signals to control the plurality of switching circuits respectively based on the plurality of fault signals.

19. The fault detection method of claim 18, wherein:
when the corresponding switching circuit is under power operation and works in CCM, comparing the corresponding duration detecting signal with a first time threshold and a second time threshold respectively, and determining whether the corresponding switching circuit is in the fault condition based on the comparison results.

20. The fault detection method of claim 18, wherein:
when the corresponding switching circuit is under power operation and works in DCM, comparing the corresponding duration detecting signal with a first time threshold and a third time threshold respectively, and determining whether the corresponding switching circuit is in the fault condition based on the comparison results.

\* \* \* \* \*